(12) United States Patent
Berresford et al.

(10) Patent No.: US 12,331,271 B2
(45) Date of Patent: Jun. 17, 2025

(54) SYSTEM AND METHOD FOR PRESERVING THE CONTENTS OF BEVERAGE CONTAINERS

(71) Applicant: BERMAR (INTERNATIONAL) LTD., Ipswich (GB)

(72) Inventors: Richard Berresford, Ipswich (GB); Russell Barker, Lawford (GB)

(73) Assignee: BERMAR (INTERNATIONAL) LTD., Ipswich (GB)

( * ) Notice: Subject to any disclaimer, the term of this patent is extended or adjusted under 35 U.S.C. 154(b) by 479 days.

(21) Appl. No.: 17/759,413

(22) PCT Filed: Dec. 21, 2020

(86) PCT No.: PCT/GB2020/053328
§ 371 (c)(1),
(2) Date: Jul. 25, 2022

(87) PCT Pub. No.: WO2021/152283
PCT Pub. Date: Aug. 5, 2021

(65) Prior Publication Data
US 2023/0069242 A1 Mar. 2, 2023

(30) Foreign Application Priority Data
Jan. 29, 2020 (GB) .................................. 2001221

(51) Int. Cl.
*C12H 1/14* (2006.01)
*B65B 31/04* (2006.01)

(52) U.S. Cl.
CPC ............ *C12H 1/14* (2013.01); *B65B 31/047* (2013.01)

(58) Field of Classification Search
CPC ................................. B65B 31/047; C12H 1/14
See application file for complete search history.

(56) References Cited

U.S. PATENT DOCUMENTS

2003/0080142 A1* 5/2003 Meheen ............... B67D 1/0888
222/61
2005/0074342 A1 4/2005 Lemme et al.
(Continued)

FOREIGN PATENT DOCUMENTS

| EP | 0478243 A1 | 9/1991 |
|---|---|---|
| WO | 2004022695 A1 | 3/2004 |
| WO | 2019021331 A1 | 1/2019 |

OTHER PUBLICATIONS

FR-3008680-A1 and translation thereof (Year: 2025).*

*Primary Examiner* — Timothy P. Kelly
(74) *Attorney, Agent, or Firm* — Hayes Soloway PC

(57) ABSTRACT

A method of preserving a liquid in a container comprises connecting a fluid flow line between a headspace of the container and a pressure modifying means and performing an operating cycle of the pressure modifying means during which the dynamic pressure in the fluid flow line is measured and compared to an initial target dynamic pressure value Pt. At the end of the operating cycle, a static pressure is measured in the fluid flow line and a pressure correction Pcorr is applied to the initial target dynamic pressure value to obtain an updated target dynamic pressure value Pt' for use in a subsequent operating cycle of the pressure modifying means. The pressure modifying means may be a vacuum pump for the preservation of still wines, or a gas supply for the preservation of sparkling wines. A corresponding system is also disclosed.

19 Claims, 3 Drawing Sheets

(56) References Cited

U.S. PATENT DOCUMENTS

2009/0211202 A1 8/2009 Lemme et al.
2018/0099803 A1 4/2018 Kagramanyan et al.

* cited by examiner

SYSTEM AND METHOD FOR PRESERVING THE CONTENTS OF BEVERAGE CONTAINERS

CROSS-REFERENCE TO RELATED APPLICATIONS AND PRIORITY

This patent application claims priority from PCT Application No. PCT/GB2020/053328 filed Dec. 21, 2020, which claims priority from GB Patent Application No. 2001221.7 filed Jan. 29, 2020. Each of these patent applications are herein incorporated by reference in their entirety.

FIELD

This disclosure relates to a system and method for preserving the contents of liquid containers, for example for the preservation of wine, champagne and similar beverages by providing a modified atmosphere within a re-sealed, part-empty bottle.

BACKGROUND

Bottled still and sparkling wines and other alcoholic beverages have a limited storage life once the originally-sealed bottle has been opened if the contents are left exposed to the air. In these circumstances, the alcohol in the beverage oxidises in the presence of atmospheric oxygen, creating oxidation products that spoil the taste of the beverage.

In the case of sparkling wines, an additional complication is that, once the bottle has been opened, the original, relatively high pressure atmosphere in the bottle is released and atmospheric pressure prevails. This leads to the rapid loss of dissolved carbon dioxide from solution, causing the wine to lose its effervescent character.

It is known, for example from the Applicant's granted European Patent EP 0478243 B1, that the storage life of still and sparkling wines can be substantially improved by re-sealing the bottle using a stopper with a suitable non-return valve, and modifying the atmosphere within the headspace of the bottle to reduce the risk of oxidation. For still wines, a vacuum pump may be used to create a subatmospheric pressure in the headspace, thereby reducing the partial pressure of oxygen available for oxidation. For sparkling wines, a superatmospheric pressure is introduced, limiting the loss of dissolved carbon dioxide to prevent the wine from going flat. The superatmospheric pressure may be created by pumping carbon dioxide into the bottle.

The present inventors have determined that an optimum increase in storage life can be achieved by precise control of the pressure of gas in the headspace. For instance, in the case of still wines, a subatmospheric pressure that is too high (i.e. where the air has not been sufficiently evacuated) does not reduce the oxidation rate sufficiently to maximise the storage life. On the other hand, a subatmospheric pressure that is too low (i.e. where too much air has been evacuated) can lead to the loss of volatile compounds from the wine, which changes the character of the wine.

In the case of sparkling wines, a superatmospheric pressure that is too low may provide insufficient pressure to reduce the rate of carbon dioxide loss to an acceptable level. A superatmospheric pressure that is too high may have a detrimental effect on the character of the effervescence. For example, the characteristic of the mousse may be affected, due to the development of undesirably large bubbles.

Against that background, it would be desirable to provide systems and methods for evacuating and/or pressurising part-empty beverage containers that allow for improved control of the resulting pressure.

SUMMARY OF THE INVENTION

From a first aspect, the present invention provides a method of preserving a liquid in a container, comprising connecting a fluid flow line between a headspace of the container and a pressure modifying means, and performing an operating cycle of the pressure modifying means by operating the pressure modifying means to start a gas flow in the fluid flow line, measuring a dynamic pressure Pd in the fluid flow line during the gas flow, comparing the measured dynamic pressure Pd to an initial target dynamic pressure value Pt and, if the measured dynamic pressure Pd meets the initial target dynamic pressure value Pt, operating the pressure modifying means to stop the gas flow.

The method further comprises, when the gas flow is stopped, measuring a static pressure Ps in the fluid flow line, determining a pressure correction Pcorr based on a difference between the measured static pressure Ps and a target static pressure value Pstat, and applying the pressure correction Pcorr to the initial target dynamic pressure value Pt to obtain an updated target dynamic pressure value Pt' for use in a subsequent operating cycle of the pressure modifying means.

Advantageously, by measuring the static pressure after a first operating cycle of the pressure modifying means, a more accurate measurement of the pressure in the headspace can be obtained than is possible from measurements of the dynamic pressure alone. The measured static pressure can for example be used to determine a correction that can be used to adjust the headspace pressure of the container and/or to set a target dynamic pressure for a future container.

To that end, the method may comprise comparing the measured static pressure Ps to the target static pressure value Pstat and, if the measured static pressure Ps does not meet the target static pressure value Pstat, performing a subsequent operating cycle of the pressure modifying means. The subsequent operating cycle comprises operating the pressure modifying means to restart the gas flow, measuring the dynamic pressure Pd in the fluid flow line during the gas flow, comparing the measured dynamic pressure Pd to the updated target dynamic pressure value Pt' and, if the measured dynamic pressure Pd meets the updated target dynamic pressure value Pt', operating the pressure modifying means to stop the gas flow.

When a subsequent operating cycle is performed, the container is preferably disconnected from the fluid flow line after performing the subsequent operating cycle. Preferably, only a single subsequent operating cycle is performed, to limit the length of time taken and the noise produced by the operation, which may be desirable in a busy commercial environment.

The method may be repeated for a further container without changing the initial target dynamic pressure value Pt. In this case, the updated target dynamic pressure value Pt' is not stored for use in future repetitions of the method. Alternatively, the method may be repeated for a further container using the updated target dynamic pressure value Pt' as the initial target dynamic pressure value Pt for the further container. In this case, the updated target dynamic pressure value Pt' calculated during the method for a given container may be stored and used as the initial target dynamic pressure value Pt for the next container.

At least for the first operation of the method, the initial target dynamic pressure value Pt preferably equals the target static pressure value Pstat.

In an embodiment, the method comprises disconnecting the container from the fluid flow line after measuring the static pressure Ps in the fluid flow line, and repeating the method for a further container using the updated target dynamic pressure value Pt' as the initial target dynamic pressure value Pt for the further container. In this case, only a single operating cycle may be performed for each container, so that no subsequent adjustment of the headspace pressure for that container is attempted. Instead, the correction value is determined and then applied when performing the method for a subsequent container. In this way, the length of time taken and the noise produced by the operation for each container is again minimised. As the method is then repeated for several containers, the target dynamic pressure value converges on a value that produces the desired headspace pressure, and continues to self-adjust to compensate for variations in performance.

Connecting the fluid flow line to the headspace may comprise fitting a valved stopper to the container, and engaging the valved stopper with a connector associated with the fluid flow line. The valved stopper preferably includes a one-way valve that either allows gas flow into the headspace but prevents gas flow out of the headspace so that the pressure in the headspace can be increased, or allows gas flow out of the headspace and prevents gas flow into the headspace so that the pressure in the headspace can be decreased. Such stoppers may be of a type known in the art, and are typically of simple construction with a high degree of reliability. Conceivably, the valved stopper may include a two-way or bidirectional valve, for example of the type described in the Applicant's granted European Patent EP 1534816 B1.

The method may include selecting the target static pressure value based on an altitude setting. The altitude setting may be selectable by a user, for example by operating switches provided in the connectors.

In an embodiment that is particularly suitable for the preservation of sparkling wines, the pressure modifying means comprises a gas supply valve connected with a gas supply, and the gas supply valve is operable to feed gas into the fluid flow line from the gas supply. In this way, operation of the gas supply valve causes an increase in pressure in the headspace of the container. The invention therefore extends to the use of the method for the preservation of sparkling beverages.

In an embodiment that is particularly suitable for the preservation of still wines, the pressure modifying means comprises a vacuum pump operable to draw gas out of the fluid flow line for reducing the pressure in the headspace. The invention accordingly extends to the use of the method for the preservation of still beverages.

The method may comprise operating a vent valve to return the flow line to atmospheric pressure before disconnection of the container. This is particularly advantageous when the pressure modifying means comprises a vacuum pump to allow easy disconnection of the container.

In an embodiment, a method for preserving still beverages in a plurality of containers is provided. In this embodiment the method comprises connecting a fluid flow line between a headspace of a first container and a vacuum pump and operating the vacuum pump to start a gas flow in the fluid flow line. Then, the method comprises measuring a dynamic pressure Pd in the fluid flow line during the gas flow, comparing the measured dynamic pressure Pd to an initial target dynamic pressure value Pt and, if the measured dynamic pressure Pd meets the initial target dynamic pressure value Pt, operating the vacuum pump to stop the gas flow. The method further comprises, when the gas flow is stopped, measuring a static pressure Ps in the fluid flow line, and disconnecting the fluid flow line from the first container. The method further comprises determining a pressure correction Pcorr based on a difference between the measured static pressure Ps and a target static pressure value Pstat, and applying the pressure correction Pcorr to the initial target dynamic pressure value Pt to obtain an updated target dynamic pressure value Pt'. The method is then repeated for a subsequent container, in which the measured dynamic pressure Pd is compared to the updated target dynamic pressure value Pt' obtained for the first container.

In another embodiment, a method for preserving a sparkling beverage in a container is provided. In this embodiment, the method comprises connecting a fluid flow line between a headspace of the container and a gas supply valve, and operating the gas supply valve to start a gas flow in the fluid flow line. Then, the method comprises measuring a dynamic pressure Pd in the fluid flow line during the gas flow, comparing the measured dynamic pressure Pd to an initial target dynamic pressure value Pt and, if the measured dynamic pressure Pd meets the initial target dynamic pressure value Pt, operating the gas supply valve to stop the gas flow. The method further comprises, when the gas flow is stopped, measuring a static pressure Ps in the fluid flow line, comparing the measured static pressure Ps to the target static pressure value Pstat and, if the measured static pressure Ps does not meet the target static pressure value Pstat, operating the gas supply valve to restart the gas flow, measuring the dynamic pressure Pd in the fluid flow line during the gas flow, comparing the measured dynamic pressure Pd to the updated target dynamic pressure value Pt' and, if the measured dynamic pressure Pd meets the updated target dynamic pressure value Pt', operating the gas supply valve to stop the gas flow.

In a second aspect, the present invention resides in a system for preserving a liquid in a container. The system comprises a pressure modifying means operable to cause gas flow in a fluid flow line, a connector for connecting the fluid flow line to a headspace of the container, a pressure sensor for measuring a pressure in the fluid flow line, a controller arranged to receive a measured pressure value from the pressure sensor and to operate the pressure modifying means, and a memory for storing an initial target dynamic pressure value Pt and a target static pressure value Pstat. The controller is configured to operate the pressure modifying means to start a gas flow in the fluid flow line, operate the pressure modifying means to stop the gas flow when the measured pressure value Pd meets the initial target dynamic pressure value Pt, determine a static pressure measurement Ps from the measured pressure value when the gas flow is stopped, determine a pressure correction Pcorr based on a difference between the static pressure measurement Ps and the target static pressure value Pstat, and apply the pressure correction Pcorr to the initial target dynamic pressure value Pt to obtain an updated target dynamic pressure value Pt'.

The controller may be further configured to compare the measured static pressure Ps to the target static pressure value Pstat and, if the measured static pressure Ps does not meet the target static pressure value Pstat, to operate the pressure modifying means to restart the gas flow, measure the dynamic pressure Pd in the fluid flow line during the gas flow, compare the measured dynamic pressure Pd to the updated target dynamic pressure value Pt' and, if the measured dynamic pressure Pd meets the updated target dynamic pressure value Pt', to operate the pressure modifying means to stop the gas flow.

The controller may be further configured to store the correction value Pcorr and/or the updated target dynamic pressure value Pt' in the memory, for example for use in a future operation of the system with a subsequent container.

The initial target dynamic pressure value Pt may equal the target static pressure value Pstat.

In an embodiment, suitable for example for the preservation of sparkling wines, the pressure modifying means may comprise a gas supply valve connected with a gas supply. The gas supply valve may be operable to feed gas into the fluid flow line from the gas supply.

In another embodiment, suitable for example for the preservation of still wines, the pressure modifying means may comprise a vacuum pump operable to draw gas out of the fluid flow line for reducing the pressure in the headspace.

The invention also extends, in a further aspect, to an apparatus for preserving still and sparkling beverages. The apparatus comprises a first system according to the second aspect of the invention, in which the pressure modifying means comprises a gas supply valve connected with a gas supply and in which a connector is arranged to receive a pressure stopper fitted to a sparkling beverage container, and a second system according to the second aspect of the invention, in which the pressure modifying means comprises a vacuum pump and in which the connector is arranged to receive a vacuum stopper fitted to a still beverage container. The apparatus is particularly suitable for use in a commercial environment in which both still and sparkling beverages are sold by the glass.

The first system and the second system of the apparatus preferably share a common pressure sensor, to reduce component costs, space requirements and complexity. The common pressure sensor may for example comprise a differential pressure sensor connected on a high pressure side to the fluid flow line of the first system and on a low pressure side to the fluid flow line of the second system.

The first system and the second system of the apparatus may share a common controller and/or a common memory. It will be appreciated that, in such cases, separate target dynamic pressure values and target static pressure values may be stored in the memory for use in the first system and the second system.

Preferred and/or optional features of each aspect and embodiment of the invention may also be used, alone or in appropriate combination, in the other aspects and embodiments also.

BRIEF DESCRIPTION OF THE DRAWINGS

Embodiments of the present invention will now be described, by way of example only, with reference to the accompanying drawings in which like reference signs are used for like features, and in which.

DESCRIPTION OF THE PREFERRED EMBODIMENTS

Figure 1:
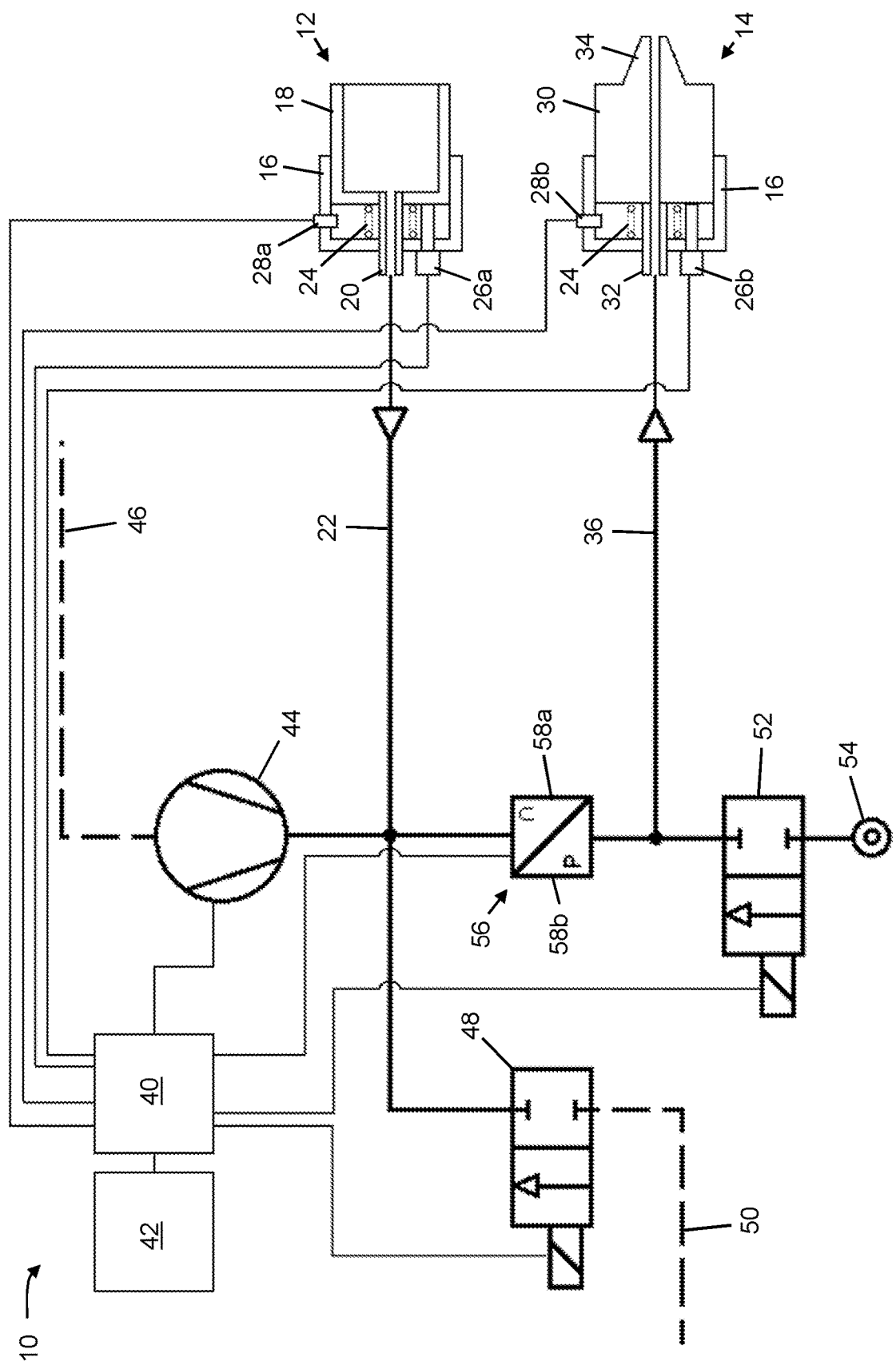
FIG. 1 is a schematic diagram of a beverage preservation system according to an embodiment of the invention.

FIG. 1 shows a liquid beverage preservation system 10 according to one embodiment of the invention.

In this example, the system 10 is operable both for the preservation of still wines, by the creation of a subatmospheric atmosphere in the headspace, and for preservation of sparkling wines, by the creation of a superatmospheric atmosphere in the headspace.

The system 10 includes a still wine connector 12 and a sparkling wine connector 14. The connectors 12, 14 are mounted in a suitable housing (not shown) which may be installed in a convenient position behind a bar or in other places where drinks are served.

The still wine connector 12 comprises a cup-shaped body 16 that retains a tubular socket 18. An air tube 20 connects the interior of the socket 18 to a fluid flow line in the form of a vacuum line 22.

The socket 18 is dimensioned to receive a vacuum stopper fitted to a wine bottle in such a way that a seal is formed between the stopper and the socket 18. The stopper (not shown) may be of a type known in the art, for example from EP 0478243 B, and includes a one-way valve that opens to permit gas flow out of the headspace of the bottle when the pressure on the outside of the stopper is lower than the pressure in the headspace, and that closes to prevent gas flow into the headspace when the pressure outside the stopper is higher than the pressure in the headspace.

The socket 18 is slidably moveable with respect to the body 16. When a stopper and bottle is inserted into the socket 18, the socket 18 can be displaced into the body 16, against the resistance of a biasing spring 24. This action closes a microswitch 26a to indicate to the system 10 that a bottle has been presented to the still wine connector 12.

The body 16 also houses a multi-colour LED module 28a. In this example, the socket 18 is of a substantially transparent material so that, when the LED module 28a is illuminated, the socket 18 acts as a light guide for displaying the light to a user of the system 10.

The sparkling wine connector 14 also comprises a cup-shaped body 16 that in this case retains a nozzle 30. An air tube 32 connects a tip 34 of the nozzle 30 to a fluid flow line in the form of a gas supply line 36.

The nozzle 30 is tapered towards the tip 34 to cooperate and form a seal with a pressure stopper fitted to a sparkling wine bottle. The pressure stopper (not shown) is also of a type known in the art, for example for example from EP 0478243 B, and includes a one-way valve that opens to permit gas flow into the headspace of the bottle when the pressure on the outside of the stopper is higher than the pressure in the headspace, and that closes to prevent gas flow out of the headspace when the pressure outside the stopper is lower than the pressure in the headspace.

The remaining features of the sparkling wine connector 14 are similar to those of the still wine connector 12. Thus the nozzle 30 is slidably moveable with respect to the body 16, against a biasing spring 24, upon engagement with a stopper. A microswitch 26b is provided to detect the connection of a bottle, and the nozzle 30 is of a transparent material to act as a light guide for an LED module 28b.

Gas flow in the vacuum line 22 and the gas supply line 36 is controlled by a microprocessor, referred to hereafter as a controller 40. The controller 40 is in data communication with a memory module 42, which may be an electrically erasable and programmable read-only memory (EEPROM). As will be explained in more detail below, the controller 40 is configured to retrieve and store data in the memory 42 during operation of the system 10. The microswitches 26a, 26b provide inputs to the controller 40, and the LED modules 28a, 28b are controlled by the controller 40 to display status information to the user.

The vacuum line 22 is connected to a vacuum pump 44 that is controlled by the controller 40. When activated, the pump 44 draws gas (i.e. air) out of the vacuum line 22 and expels the gas through an exhaust 46 to lower the pressure in the vacuum line 22, thereby drawing gas out of the headspace of the connected bottle.

A vent valve 48 is also connected to the vacuum line 22. The vent valve 48 is switchable by the controller 40 from a normally-closed position, in which no gas flow occurs through the vent valve 48, to an open position in which air can flow from a vent port 50 through the vent valve 48 and into to the vacuum line 22. The vent valve 48 can therefore be used to return the vacuum line 22 to atmospheric pressure once the vacuum pump 44 has stopped operating.

The gas supply line 36 is connected to a gas supply valve 52, which is normally closed. The gas supply valve 52 is switchable by the controller 40 into an open position in which gas at a relatively high pressure is admitted to the gas supply line 36 from a gas supply, which in this example comprises a reservoir 54. The reservoir 54 may, for example, be a pressurised gas cylinder containing carbon dioxide or another suitable gas. The cylinder is fitted with a regulator so that the flow rate from the cylinder can be set to a suitable level.

In the illustrated embodiment, both the vacuum vent valve 48 and the gas supply valve 52 are solenoid valves, although any suitable type of valve could be used.

Both the vacuum supply line 22 and the gas supply line 36 are connected to a pressure sensor 56. In this embodiment, the pressure sensor 56 is a differential pressure sensor. The vacuum supply line 22 is connected to a low-pressure side 58a of the pressure sensor 56, while the gas supply line 36 is connected to a high-pressure side 58b of the pressure sensor 56. The pressure sensor 56 provides an output to the controller 40, via an analogue to digital converter (not shown). The output relates to the instantaneous pressure in the vacuum supply line 22 or the gas supply line 36 respectively. It will be appreciated that, when the still wine connector 12 is in use, the high-pressure side 58b of the pressure sensor 56 is open to atmospheric pressure via the sparkling wine connector 14 so that the pressure sensor output reflects the pressure in the vacuum supply line 22 relative to atmospheric pressure. Correspondingly, when the sparkling wine connector 14 is in use, the low-pressure side 58a of the pressure sensor 56 is open to atmospheric pressure via the still wine connector 12 and the pressure sensor output reflects the pressure in the gas supply line 36 relative to atmospheric pressure.

When gas is flowing in either the vacuum supply line 22 or the gas supply line 36, due to operation of the vacuum pump 44 or the gas supply valve 52 and reservoir 54 respectively, the pressure sensor 56 provides a measurement of the dynamic pressure in the respective line 22, 36. When there is no gas flow, the pressure sensor 56 provides a measurement of the static pressure in the respective line 22, 36. In both cases, the respective dynamic or static pressure measured by the pressure sensor 56 corresponds to the pressure in the headspace, which is part of the same pneumatic system as the corresponding line 22, 36 when the bottle is connected. As a consequence of the law of conservation of energy for a fluid in motion, the measured dynamic pressure will be lower than the measured static pressure and will depend on the fluid dynamics of the flow path from the headspace to the vacuum pump 44 or the reservoir 54.

The extent of the difference depends on several factors, including various flow restrictions in the flow path. In particular, the difference will be influenced by the behaviour of the valve in the stopper and by tolerances in other components in the system. The difference can be expected to vary between systems due to manufacturing tolerances, between batches of stoppers, and over time (due to wear of components). It is therefore not possible to determine a pre-set value that would reliably correct for the difference between a desired, optimum static pressure and a measured dynamic pressure.

As will be explained in more detail below, to address this problem, the system 10 uses measurements of both the dynamic pressure and the static pressure to achieve a more accurate resulting pressure in the headspace than would be possible by measurement of the dynamic pressure alone.

Operation of the system 10 for the preservation of the remaining contents of a part-empty still wine bottle will now be described with reference to FIG. 2.

As a preliminary step, a suitable vacuum stopper is fitted into the neck of the bottle. As described above, the vacuum stopper includes a one-way or non-return valve that allows gas flow out of the headspace of the bottle while preventing gas flow into the headspace. A main on-off switch (not shown) of the system 10 may also be activated at this time. The LED modules 28a, 28b of both connectors 12, 14 may provide a display indicating that the system 10 is in a ready-to-use condition.

In step 201, the system 10 is activated by engaging the bottle, with the stopper, with the still wine connector 12. The bottle is pushed into the socket 18, which causes translation of the socket 18 with respect to the body 16 and activation of the microswitch 26a. The controller 40 detects that the microswitch 26a has closed and, in response, begins an operating cycle of the vacuum pump 44.

Therefore, at step 202, the vacuum pump 44 is switched on by the controller 40. At the same time, the LED module 28a of the still wine connector 12 is switched to display an "in-use" status indication. The LED module 28b of the sparkling wine connector 14 may be extinguished.

The vacuum pump 44 draws air out of the headspace of the bottle, through the vacuum line 22, and expels it through the exhaust 46. When the pump 44 is running, in step 203, the dynamic pressure Pd in the vacuum line 22 is measured using the pressure sensor 56. In step 204, the controller 40 compares the measured dynamic pressure Pd to a target dynamic pressure Pt. An initial value of the target dynamic pressure Pt is stored in advance in the memory 42, and is retrieved by the controller 40 at a suitable time.

If the measured dynamic pressure Pd does not meet the target dynamic pressure Pt, then the method returns to step 203. Operation of the vacuum pump 44 continues, and the dynamic pressure Pd is re-measured and again compared with the target dynamic pressure Pt.

When the measured dynamic pressure Pd reaches the target dynamic pressure Pt, the method advances to step 205, and the controller 40 stops the vacuum pump 44.

Then, at step 206, the static pressure Ps is measured by the pressure sensor 56. As noted above, the static pressure Ps measured at step 206 will differ from the dynamic pressure Pd measured at step 204 just before the vacuum pump 44 stops, due to fluid flow effects on the pressure. At step 207, the controller 40 retrieves a target static pressure value Pstat from the memory 42 and compares it to the measured static pressure Ps to calculate a correction value Pcorr=Pstat−Ps.

Then, in step 208, a revised or updated target dynamic pressure value Pt' is calculated by summing the initial target dynamic pressure Pt and the correction value Pcorr. The updated target dynamic pressure value Pt' is stored in the memory 42 for use the next time the system 10 is used for the preservation of a still wine. Alternatively (and equivalently) the initial target dynamic pressure value Pt and the correction value Pcorr may be stored in the memory 42 so that the updated target dynamic pressure value Pt' can be calculated when required.

In step 209, the vent valve 48 is opened to admit air from the vent 50 into the vacuum supply line 22. This allows the bottle to be removed from the still wine connector 12. Then, in step 210, the LED module 28a of the still wine connector is switched to display an "end-of-operation" status indication, to indicate to the user that the bottle can be removed from the system 10 and placed into storage.

Figure 2:
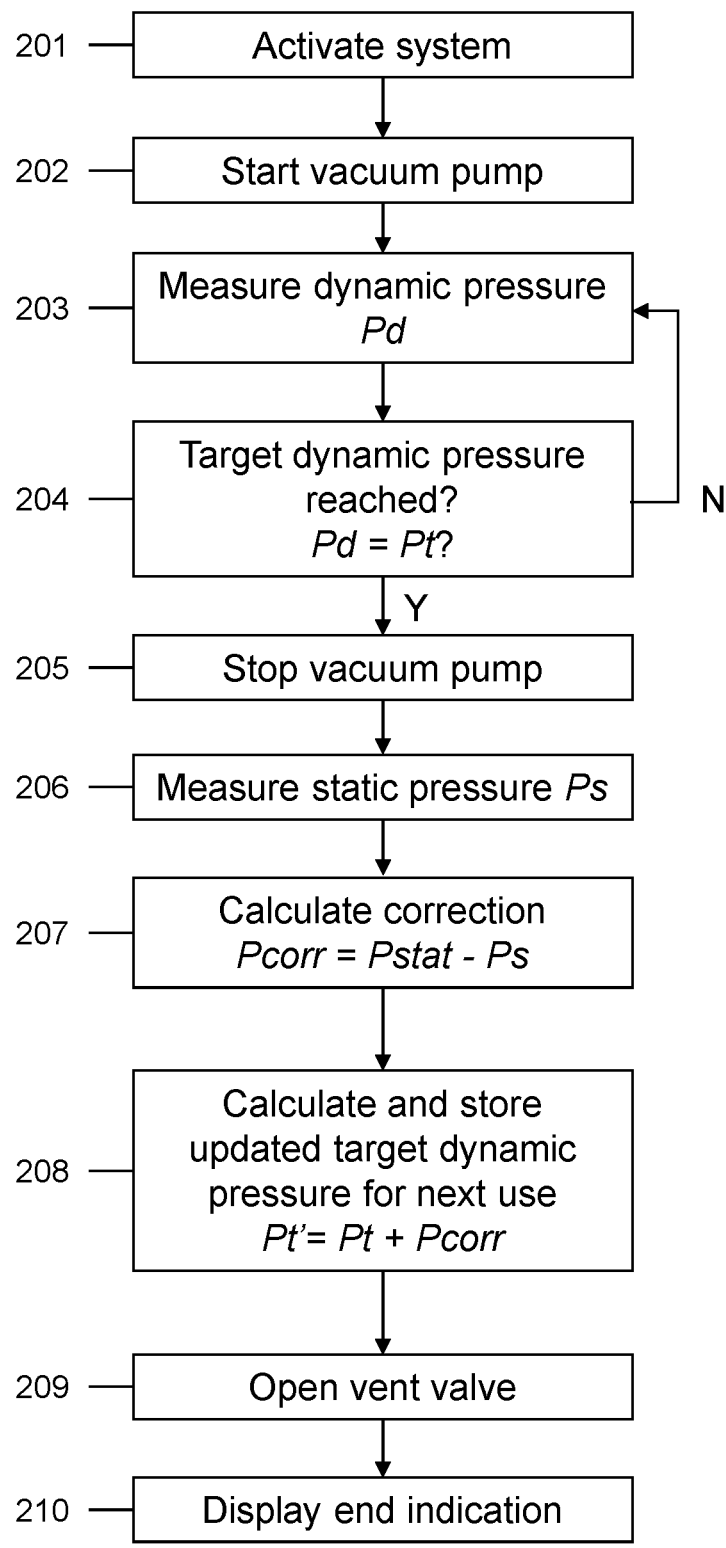
FIG. 2 shows a method of preserving a still beverage using the system of FIG. 1.

The next time the system 10 is used for a still wine bottle, the method of FIG. 2 is repeated. However, in step 204, the updated target dynamic pressure value Pt', calculated and stored during the previous operation, is retrieved from the memory 42 and used as the target for the measured dynamic pressure Pd. In this way, the static pressure Ps, measured in step 206, can be expected to be closer to the target static pressure value Pstat, resulting in a headspace pressure that is closer to the desired value than was achieved for the previous bottle. Upon subsequent operations for still wine bottles, the updated target dynamic pressure value Pt' may be further refined. After being used in several successive operations, the system 10 then reliably delivers a headspace pressure that is very close to the target static pressure value Pstat. The system 10 will continue to update the target dynamic pressure value Pt' on each subsequent operation to adjust for minor variations in performance, for example due to component wear.

Table 1 shows, for five successive operations of the method of FIG. 2, example values for the target static pressure Pstat, the target dynamic pressure value Pt, the measured static pressure Ps at step 206, the correction value Pcorr calculated at step 207, and the updated target dynamic pressure value Pt' calculated and stored at step 208.

TABLE 1

Example values in successive operations for still wine preservation. Values in mbar ($10^{-2}$ Pa)

|  | first operation | second operation | third operation | fourth operation | fifth operation |
| --- | --- | --- | --- | --- | --- |
| Pstat | 620 | 620 | 620 | 620 | 620 |
| Pt | 620 | 640 | 645 | 645 | 640 |
| Ps | 600 | 615 | 620 | 625 | 620 |
| Pcorr | 20 | 5 | 0 | −5 | 0 |
| Pt' | 640 | 645 | 645 | 640 | 640 |

In this example, before the first operation, Pt is set equal to Pstat (although this need not be the case). The measured static pressure Ps after the vacuum pump has been switched off is lower than required, so the updated target dynamic pressure value Pt' is increased to compensate. In the second operation, the new updated target dynamic pressure value Pt' is used at the target in step 204, and the measured static pressure Ps after pumping is then closer to, but still not equal to, Pstat, so another adjustment is made to Pt'. In the third operation, the desired Pstat is achieved, no adjustment is required, but in the fourth operation an adjustment in the other direction is made.

It will be appreciated that, in the method of FIG. 2, only a single cycle of the vacuum pump is performed (i.e. steps 202 to 205) per operation. Thus the pressure in the headspace is not adjusted for an individual bottle. Instead, when repeated over several preservation operations, the system 10 adopts a target dynamic pressure value that reliably produces a headspace pressure that is equal or suitably close to the desired target static pressure value Pstat.

Operation of the system 10 for the preservation of the remaining contents of a part-empty sparkling wine bottle will now be described with reference to FIG. 3.

As a preliminary step, a suitable pressure stopper is fitted into the neck of the bottle. As described above, the pressure stopper includes a one-way or non-return valve that allows gas flow into the headspace of the bottle while preventing gas flow out of the headspace. The main on-off switch (not shown) of the system 10 may be activated.

At step 301, the system 10 is activated by engaging the bottle, with the stopper, with the sparkling wine connector 14. The stopper is pushed on to the tip 34 of the nozzle 30, causing translation of the nozzle 30 and activation of the microswitch 26b. The controller 40 detects that the microswitch 26b has closed and, in response, begins an operating cycle of the gas supply valve 52.

At step 302, the gas supply valve 52 is triggered to open by the controller 40. At the same time, the LED module 28b of the sparkling wine connector 14 is switched to display an "in-use" status indication, and the LED module 28a of the still wine connector 12 may be extinguished.

With the gas supply valve 52 open, gas flows from the reservoir 54 through the valve and into the headspace of the bottle, by way of the gas supply line 36. In this way, the gas pressure in the headspace increases.

In step 303, while the gas supply valve 52 is open, the dynamic pressure Pd in the gas supply line 36 is measured using the pressure sensor 56. In step 304, the controller 40 compares the measured dynamic pressure Pd to an initial target dynamic pressure value Pt. In this method, the initial target dynamic pressure value Pt is set equal to the desired target static pressure value Pstat. The target dynamic pressure value Pt is stored in advance in the memory 42, and is retrieved by the controller 40 at a suitable time.

If the measured dynamic pressure Pd does not meet the target dynamic pressure value Pt, then the method returns to step 303. The gas supply valve 52 remains open, and the dynamic pressure Pd is re-measured and again compared with the target dynamic pressure value Pt.

When the measured dynamic pressure Pd reaches the target dynamic pressure value Pt, the method advances to step 305, and the controller 40 closes the gas supply valve 52.

At step 306, the static pressure Ps is measured by the pressure sensor 56. At step 307, the controller 40 compares the measured static pressure Ps to the target static pressure Pstat.

If the measured static pressure Ps meets (or exceeds) the target static pressure value Pstat, then the operation is complete, and at step 308 an "end-of-operation" status indication is displayed using the LED module 28b. The user can then remove the bottle and the stopper from the sparkling wine connector 14. Release of the bottle will vent the gas supply line 36 back to atmospheric pressure.

If, in step 307, the measured static pressure Ps does not meet the target static pressure value Pstat then, at step 309, a correction value Pcorr is calculated as the difference between the target static pressure value Pstat and the measured static pressure Ps. The controller 40 then starts a second operating cycle of the gas supply valve 52 by opening the gas supply valve 52 at step 310.

At step 311, the dynamic pressure Pd in the gas supply line 36 is measured again using the pressure sensor 56. In step 312, the controller 40 compares the measured dynamic pressure Pd to an updated target dynamic pressure value Pt', which is obtained by summing the initial target dynamic pressure value Pt and the correction value Pcorr.

If the measured dynamic pressure Pd does not meet the updated target dynamic pressure value Pt, then the method returns to step 311. Once the measured dynamic pressure Pd reaches the updated target dynamic pressure value Pt', the controller 40 closes the gas supply valve 52 at step 313, and then the method continues to step 308 for the display of an "end-of-operation" indication as described above.

For subsequent uses of the system 10 to preserve sparkling wines, the target dynamic pressure Pt is re-set to its initial value, equal to the target static pressure value Pstat. Therefore, in the sparkling wine method, the updated target dynamic pressure Pt' calculated for a given bottle is used to "top up" the pressure in the headspace of that bottle if necessary, but the updated target dynamic pressure Pt' is not carried forward for use with subsequent bottles.

Figure 3:
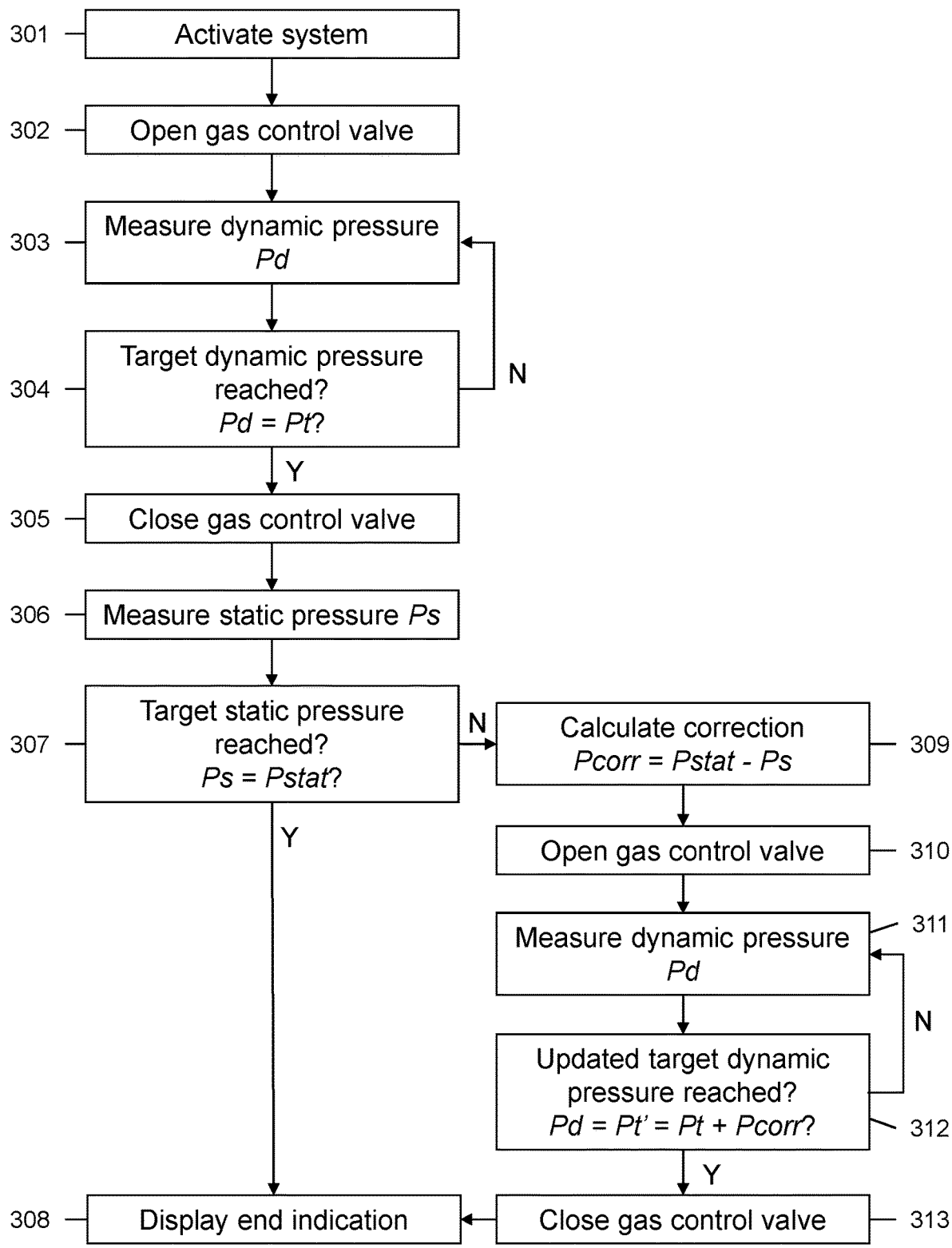
FIG. 3 shows a method of preserving a sparkling beverage using the system of FIG. 1.

Table 2 shows, for four successive operations of the method of FIG. 3, example values for the initial target dynamic pressure Pt (equal to the target static pressure Pstat), the measured static pressure Ps at step 206, the correction value Pcorr calculated at step 207, and the updated target dynamic pressure Pt' calculated and stored at step 208.

TABLE 2

Example values in successive operations for sparkling wine preservation. Values in kPa.

|  | first operation | second operation | third operation | fourth operation |
|---|---|---|---|---|
| Pt = Pstat | 145 | 145 | 145 | 145 |
| Ps | 135 | 132 | 145 | 145 |
| Pcorr | 10 | 13 | 0 | 0 |
| Pt' | 155 | 158 | n/a | n/a |

In this example, before each operation, Pt is set equal to Pstat, and this value remains unchanged between successive operations. In the first and second operations, the measured static pressure Ps after the gas flow has stopped is lower than required, so the updated target dynamic pressure Pt' is increased to compensate, and a second cycle of the gas control valve 52 is performed until the measured dynamic pressure Pd reaches the updated target dynamic pressure Pt'. In the third and fourth operations, the measured static pressure Ps is equal to the target static pressure Pstat, so no correction is required and no second cycle of the gas control valve 52 is initiated.

In the method of FIG. 3, up to two operating cycles of the gas control valve 52 are performed, with the first cycle (in steps 302 to 305) pressurising the headspace to a pressure close to the desired pressure, and the second cycle (in steps 310 to 313) adjusting the pressure if necessary. This approach provides a suitable balance between achieving the desired pressure in the headspace on the one hand, and the time taken to complete the operation and noise emitted by the system 10 (principally from switching of the gas control valve 52) on the other hand.

However, if finer control of the headspace pressure is required, in a variant of the method of FIG. 3 the process could return to step 306 after reaching step 313, so that one or more additional operating cycles of the gas control valve 52 are performed if the measured static pressure Ps remains below the target static pressure Pstat. In such cases, the gas control valve 52 may perform three or more operating cycles before the end of the operation.

The methods of FIG. 2 and FIG. 3 both involve the comparison of dynamic and static pressure measurements to determine an updated target dynamic pressure for use in a subsequent operating cycle of the pressure modifying means (i.e. the vacuum pump in the case of the still wine preservation method of FIG. 2, and the gas control valve and reservoir in the case of the sparkling wine preservation method of FIG. 3).

In the case of the still wine preservation method of FIG. 2, the subsequent operating cycle of the vacuum pump takes place in a subsequent operation of the system. Said another way, after the first operating cycle, the system does not try to correct the pressure of the current bottle, but instead aims to bring the next bottle closer to the desired headspace pressure. Because the vacuum level applied by the vacuum pump can be expected to be reasonably consistent between operations, this approach allows the system to converge on a suitable target dynamic pressure.

In the case of the sparkling wine preservation method of FIG. 3, the first and subsequent operating cycles of the gas supply valve take place in the same operation of the system, i.e. on the same bottle. In this example the updated target dynamic pressure is not carried forward to the next operation for the next bottle, but instead the target dynamic pressure is re-set to equal the target static pressure. This approach reflects the possibility that the gas flow rate and pressure supplied by the reservoir may differ between operations, for example due to the fill level of the reservoir.

It will however be appreciated that aspects of the methods of FIGS. 2 and 3 could be used in combinations other than those explicitly described above. For example, it would be possible to perform one or more further cycles of the vacuum pump in the still wine preservation method, and/or to use the updated target dynamic pressure in subsequent operations of the sparkling wine preservation method.

For instance, in the still wine preservation method, one or more further cycles of the vacuum pump may be performed during the first operation after installation, or after the system has been re-set (for example after being switched off by the main on-off switch). In this way, a more accurate headspace pressure is achieved in the first bottle used with the system after a re-set than would otherwise be the case.

It will also be appreciated that it is possible to perform the methods of FIGS. 2 and 3 two or more times on the same bottle or container to increase further the accuracy of the headspace pressure.

Preferably, for both still and sparkling beverage preservation, the value of the respective target static pressure Pstat is pre-set to a suitable value, which may be selected according to the beverage to be preserved. For still wine preservation, the target static pressure Pstat may be between approximately 500 mbar (50 kPa) and approximately 700 mbar (75 kPa), is preferably between approximately 600 mbar (60 kPa) and approximately 640 mbar (64 KPa), and is most preferably approximately 620 mbar (62 kPa). For champagne and sparkling wine preservation, the target static pressure Pstat may be between approximately 18 psi (125 kPa) and approximately 24 psi (165 kPa), is preferably between approximately 20 psi (138 kPa) and approximately 22 psi (152 kPa), and is most preferably approximately 21 psi (145 kPa).

In both cases, the pre-set value may include an adjustment factor that takes into account the altitude at which the system is to be used, which affects the ambient atmospheric pressure.

For this and other purposes, the system 10 may be configured to accept inputs using the microswitches 26a, 26b of the connectors 12, 14, which can be triggered manually by pushing the socket 18 or the nozzle 30. The main on-off switch, if provided, may also be used in combination with the microswitches 26a, 26b. Feedback can be provided to the user by way of the LED modules 28a, 28b, which can be configured to display information through coded colours, combinations of colours, flashes and so on. The system 10 may also be provided with an audio sounder to provide audible feedback in the form of beeps or other suitable sounds.

In one example, the controller 40 can be set into an installation mode, by operating the microswitches 26a, 26b in a suitable pattern. Upon entering the installation mode, the LED modules 28a, 28b display a suitable indication to the user. By operating the microswitches 26a, 26b in another pattern, the controller 40 can be instructed to receive an altitude input. The altitude input may correspond to an altitude range within which the installation location of the system lies. Based on the altitude input, the controller 40 then adjusts the target static pressures accordingly.

It will be appreciated that the use of the connectors 12, 14 and the corresponding LED modules 28a, 28b as user inputs and outputs for the controller 40 can be applied to many other functions, such as performing initial installation and calibration operations, setting and adjusting parameters such as the target static pressure, obtaining usage and status information such as the number of operations completed and service requirements, controlling whether the system performs additional operating cycles during the first use of the system, and so on.

As another example, the colours displayed by the LED modules to indicate the status of the system may be selectable by a user or installer. In particular, it may be possible to set the colour indicating a ready-to-use condition so that it is suitable for the décor of the environment in which the system is installed. Another option is to set the LED modules to display a plurality of different colours in sequence, in which case the colours displayed and/or the interval between colour changes may be user-selectable.

The system 10 illustrated in FIG. 1 may be implemented in any suitable form. For example, all of the components of the system 10 may be housed in a single unit. Alternatively, one or more components may be provided in separate housings and/or locations. The gas reservoir 54 in particular may be located remotely, and connected to the rest of the system 10 with a suitable supply pipe. In another example, the connectors 12, 14 may be housed in a first unit, with the controller, 40, memory 42, vacuum pump 44, vent valve 48, gas supply valve 52 and pressure sensor 56 being housed remotely in a second unit.

The system may include one or more pressure relief devices (not shown) to prevent damage to the system components, the stopper and the bottle in the event of a failure. For example, a pressure relief valve may be provided to vent pressure from the gas supply line in the event of a failure of the gas supply valve. Further pressure relief devices may be provided between the gas supply valve and the gas cylinder, for example as part of the regulator. For similar reasons, the vacuum pump may be selected so that the maximum vacuum that can be drawn by the pump is higher than the maximum vacuum required to reach the target static pressure by a suitable margin, but so that the maximum vacuum does not increase the risk of damage in the event of a control failure.

The embodiment of the system illustrated in FIG. 1 conveniently provides the ability to preserve both still and sparkling wines. It will be understood, however, that other embodiments may be configured only to preserve still wines, or only to preserve sparkling wines, by the omission of the relevant components. By duplication of suitable components, two or more still wine connectors and/or two or more sparkling wine connectors could be provided in the same system.

For systems with the ability to preserve both still and sparkling wines, the use of a single controller, memory and pressure sensor provides some cost and space benefits. However, it will be appreciated that separate controllers, memories and/or pressure sensors could be provided to operate only with the corresponding still or sparkling wine components.

The systems and methods described above are not limited to use for the preservation of still and sparkling wines. Instead, the invention may be beneficially applied for the preservation of other beverages, and also to non-beverage liquids.

Further modifications and variations of the present invention may also be contemplated without departing from the scope of the invention as defined in the appended claims.

The invention claimed is:

1. A method of preserving a liquid in a container, comprising:
   connecting a fluid flow line between a headspace of the container and a pressure modifying device;
   performing an operating cycle of the pressure modifying device by:
      operating the pressure modifying device to start a gas flow in the fluid flow line;
      during the gas flow, measuring a dynamic pressure Pd in the fluid flow line;
      comparing the measured dynamic pressure Pd to an initial target dynamic pressure value Pt;
      determining that the measured dynamic pressure Pd meets the initial target dynamic pressure value Pt;
      in response to the determining step, operating the pressure modifying device to stop the gas flow;
   after the gas flow is stopped, measuring a static pressure Ps in the fluid flow line;
   determining a pressure correction Pcorr based on a difference between the measured static pressure Ps and a target static pressure value Pstat; and
   applying the pressure correction Pcorr to the initial target dynamic pressure value Pt to obtain an updated target dynamic pressure value Pt' for use in a subsequent operating cycle of the pressure modifying device.

2. The method according to claim 1, comprising:
   comparing the measured static pressure Ps to the target static pressure value Pstat;
   determining that the measured static pressure Ps does not meet the target static pressure value Pstat,
   and, in response to determining that the measured static pressure Ps does not meet the target static pressure value Pstat, performing a subsequent operating cycle of the pressure modifying device, said subsequent operating cycle comprising:
      operating the pressure modifying device to restart the gas flow;
      during the gas flow, measuring the dynamic pressure Pd in the fluid flow line;
      comparing the measured dynamic pressure Pd to the updated target dynamic pressure value Pt';
      determining that the measured dynamic pressure Pd meets the updated target dynamic pressure value Pt';
      and, in response to determining that the measured dynamic pressure Pd meets the updated target dynamic pressure value Pt', operating the pressure modifying device to stop the gas flow.

3. The method according to claim 2, comprising disconnecting the container from the fluid flow line after performing the subsequent operating cycle.

4. The method according to claim 3, comprising repeating all of the steps of the method for a further container without changing the initial target dynamic pressure value Pt.

5. The method according to claim 1, further comprising:
disconnecting the container from the fluid flow line after measuring the static pressure Ps in the fluid flow line; and
repeating all of the steps of the method for a further container using the updated target dynamic pressure value Pt' as the initial target dynamic pressure value Pt for the further container.

6. The method according to claim 1, comprising operating a vent valve to return the flow line to atmospheric pressure before disconnection of the container.

7. The method according to claim 1, wherein the initial target dynamic pressure value Pt equals the target static pressure value Pstat.

8. The method according to claim 1, wherein connecting the fluid flow line to the headspace comprises fitting a valved stopper to the container, and engaging the valved stopper with a connector associated with the fluid flow line.

9. The method according to claim 1, comprising selecting the target static pressure value Pstat based on an altitude setting.

10. The method according to claim 1, wherein the pressure modifying device comprises a gas supply valve connected with a gas supply, the gas supply valve being operable to feed gas into the fluid flow line from the gas supply.

11. The method according to claim 1, wherein the pressure modifying device comprises a vacuum pump operable to draw gas out of the fluid flow line for reducing the pressure in the headspace.

12. A system for preserving a liquid in a container, the system comprising:
a pressure modifying device operable to cause gas flow in a fluid flow line;
a connector for connecting the fluid flow line to a headspace of the container;
a pressure sensor for measuring a pressure in the fluid flow line;
a controller arranged to receive a measured pressure value from the pressure sensor and to operate the pressure modifying device; and
a memory for storing an initial target dynamic pressure value Pt and a target static pressure value Pstat;
wherein the controller is configured to:
operate the pressure modifying device to start a gas flow in the fluid flow line;
operate the pressure modifying device to stop the gas flow when the measured pressure value Pd meets the initial target dynamic pressure value Pt;
determine a static pressure measurement Ps from the measured pressure value when the gas flow is stopped;
determine a pressure correction Pcorr based on a difference between the static pressure measurement Ps and the target static pressure value Pstat; and
apply the pressure correction Pcorr to the initial target dynamic pressure value Pt to obtain an updated target dynamic pressure value Pt'.

13. The system according to claim 12, wherein the controller is further configured to:
compare the measured static pressure Ps to the target static pressure value Pstat;
and, if the measured static pressure Ps does not meet the target static pressure value Pstat:
operate the pressure modifying device to restart the gas flow;
during the gas flow, measure the dynamic pressure Pd in the fluid flow line;
compare the measured dynamic pressure Pd to the updated target dynamic pressure value Pt'; and, if the measured dynamic pressure Pd meets the updated target dynamic pressure value Pt', operate the pressure modifying device to stop the gas flow.

14. The system according to claim 12, wherein the controller is further configured to store the correction value Pcorr and/or the updated target dynamic pressure value Pt' in the memory.

15. The system according to claim 12, wherein the initial target dynamic pressure value Pt equals the target static pressure value Pstat.

16. The system according to claim 12, wherein the pressure modifying device comprises a gas supply valve connected with a gas supply, the gas supply valve being operable to feed gas into the fluid flow line from the gas supply.

17. The system according to claim 12, wherein the pressure modifying device comprises a vacuum pump operable to draw gas out of the fluid flow line for reducing the pressure in the headspace.

18. An apparatus for preserving still and sparkling beverages, comprising:
a first system comprising:
a gas supply valve connected with a gas supply, the gas supply valve being operable to feed gas into a first fluid flow line from the gas supply;
a first connector for connecting the first fluid flow line to a first headspace of a first container, the first connector being arranged to receive a pressure stopper fitted to a sparkling beverage container;
a first pressure sensor for measuring a first pressure in the first fluid flow line;
a first controller arranged to receive a measured first pressure value from the first pressure sensor and to operate the gas supply valve; and
a first memory for storing a first initial target dynamic pressure value Pt and a first target static pressure value Pstat;
wherein the first controller is configured to:
operate the gas supply valve to start a first gas flow in the first fluid flow line;
operate the gas supply valve to stop the first gas flow when the measured first pressure value Pd meets the first initial target dynamic pressure value Pt;
determine a first static pressure measurement Ps from the measured first pressure value when the first gas flow is stopped;
determine a first pressure correction Pcorr based on a difference between the first static pressure measurement Ps and the first target static pressure value Pstat; and
apply the first pressure correction Pcorr to the first initial target dynamic pressure value Pt to obtain an updated first target dynamic pressure value Pt'; and a second system comprising:
  a vacuum pump operable to draw gas out of a second fluid flow line for reducing the pressure in a second headspace of a second container;
  a second connector for connecting the second fluid flow line to the second headspace of the second container, the second connector being arranged to receive a vacuum stopper fitted to a still beverage container;
  a second pressure sensor for measuring a second pressure in the second fluid flow line;
  a second controller arranged to receive a measured second pressure value from the second pressure sensor and to operate the vacuum pump; and
  a second memory for storing a second initial target dynamic pressure value Pt and a second target static pressure value Pstat;
  wherein the second controller is configured to:
    operate the vacuum pump to start a second gas flow in the second fluid flow line;
    operate the vacuum pump to stop the second gas flow when the measured second pressure value Pd meets the second initial target dynamic pressure value Pt;
    determine a second static pressure measurement Ps from the measured second pressure value when the second gas flow is stopped;
    determine a second pressure correction Pcorr based on a difference between the second static pressure measurement Ps and the second target static pressure value Pstat; and
    apply the second pressure correction Pcorr to the second initial target dynamic pressure value Pt to obtain an updated second target dynamic pressure value Pt'.

19. The apparatus according to claim 18, wherein the first pressure sensor and the second pressure sensor are embodied by a common pressure sensor, the common pressure sensor comprising a differential pressure sensor connected on a high pressure side to the first fluid flow line of the first system for measuring the first pressure in the first fluid flow line and on a low pressure side to the second fluid flow line of the second system for measuring the second pressure in the second fluid flow line.

* * * * *